(12) United States Patent
Molinas Lombart et al.

(10) Patent No.: US 10,587,781 B2
(45) Date of Patent: Mar. 10, 2020

(54) METHOD AND SYSTEM FOR SYNCHRONISING VIDEO AND DATA

(71) Applicants: Eloi Molinas Lombart, Sant Cugat del Valles (ES); Ángel Andrés Morán, Corbera de Llobregat (ES)

(72) Inventors: Eloi Molinas Lombart, Sant Cugat del Valles (ES); Ángel Andrés Morán, Corbera de Llobregat (ES)

( * ) Notice: Subject to any disclaimer, the term of this patent is extended or adjusted under 35 U.S.C. 154(b) by 0 days.

(21) Appl. No.: 16/076,782

(22) PCT Filed: Feb. 6, 2017

(86) PCT No.: PCT/EP2017/052560
§ 371 (c)(1),
(2) Date: Aug. 9, 2018

(87) PCT Pub. No.: WO2017/137358
PCT Pub. Date: Aug. 17, 2017

(65) Prior Publication Data
US 2019/0052777 A1    Feb. 14, 2019

(30) Foreign Application Priority Data
Feb. 9, 2016 (ES) .................................. 201630148

(51) Int. Cl.
*H04N 5/04*        (2006.01)
*H04N 19/467*      (2014.01)
(Continued)

(52) U.S. Cl.
CPC .............. *H04N 5/04* (2013.01); *H04N 19/172* (2014.11); *H04N 19/467* (2014.11);
(Continued)

(58) Field of Classification Search
CPC ...... H04N 5/04; H04N 19/172; H04N 19/467; H04N 19/68; H04N 19/86; H04N 21/23892; H04N 21/4307
See application file for complete search history.

(56) References Cited

U.S. PATENT DOCUMENTS 6,342,924 B1 * 1/2002 Ikeda ................... H04N 5/4401
                                                     348/473
2001/0012019 A1 * 8/2001 Yamazaki ............... G06T 1/005
                                                     345/639
(Continued)

FOREIGN PATENT DOCUMENTS

GB    2425906    11/2006
GB    2527662    12/2015
(Continued)

OTHER PUBLICATIONS

Office Action corresponding to Spanish Patent Application No. 201630148 dated Nov. 11, 2016.
(Continued)

*Primary Examiner* — Michael E Teitelbaum
(74) *Attorney, Agent, or Firm* — Jenkins, Wilson, Taylor & Hunt, P.A.

(57) ABSTRACT

The method comprises: —generating a marked video signal by extracting an image fragment (V) from a region (R) of an original frame (F), and arranging a watermark (M) thereon; and —generating a data signal, including therein the extracted image fragment extracted (V) and/or reconstruction information; —performing an additional synchronisation step, which comprises: —obtaining, from the data signal, the image fragment (V) and/or the reconstruction information, —obtaining, from the marked video signal, an incomplete frame (Fr), and —attempting to reconstruct the original frame (F) from the information obtained from the data signal and the marked video signal, and, if the recon-
(Continued)

struction is successful, determining that the synchronisation is correct. The system is adapted to implement the method of the invention.

8 Claims, 2 Drawing Sheets

(51) Int. Cl.
  *H04N 21/2389* (2011.01)
  *H04N 19/86* (2014.01)
  *H04N 21/43* (2011.01)
  *H04N 19/68* (2014.01)
  *H04N 19/172* (2014.01)

(52) U.S. Cl.
  CPC ............ *H04N 19/68* (2014.11); *H04N 19/86* (2014.11); *H04N 21/23892* (2013.01); *H04N 21/4307* (2013.01)

(56) References Cited

U.S. PATENT DOCUMENTS

| 2009/0110231 | A1 | 4/2009 | Rzeszewski et al. |
| 2014/0013374 | A1 | 1/2014 | Oh et al. |
| 2015/0242983 | A1 | 8/2015 | DiGiovanni |
| 2015/0264429 | A1 | 9/2015 | Winograd et al. |
| 2016/0337433 | A1* | 11/2016 | Elias ................. H04N 21/4307 |

FOREIGN PATENT DOCUMENTS

| WO | WO2005089476 A2 | 9/2005 |
| WO | WO2007072327 A2 | 6/2007 |

OTHER PUBLICATIONS

International Search Report corresponding to International Application No. PCT/EP2017/052560 dated May 10, 2017.
Lin et al. (2004) Streaming Video and Rate Scalable Compression: What Are the Challenges for Watermarking? Journal of Electronic Imaging. 13(1):198-208.

* cited by examiner

METHOD AND SYSTEM FOR SYNCHRONISING VIDEO AND DATA

FIELD OF THE INVENTION

The present invention generally relates, in a first aspect, to a method for synchronising video and data, which comprises using watermark information and, more particularly, to a method that comprises performing an additional synchronisation step, with part of the information of said watermark.

A second aspect of the present invention relates to a system for synchronising video and data, which is adapted to implement the method of the first aspect.

PRIOR ART

In the prior art, methods for synchronising video and data have been disclosed with the characteristics included in the preamble of claim 1 of the present invention, i.e. which comprise:

i) providing at least one marked video signal that includes a video signal which comprises at least one marked frame that includes a watermark on one region of at least one original frame (understanding "original" to mean initial), wherein said watermark includes encoded information for synchronising said at least one original frame with data associated thereto;

ii) sending the aforementioned marked video signal to a receiver with access to a data signal that contains said associated data; and iii) performing a synchronisation step which comprises said receiver extracting the synchronisation information included in the watermark of said marked frame of the marked video signal, decoding it and using it to synchronise said original frame with said data associated thereto.

This is the case of the methods disclosed in patent documents US20150242983A1, WO2007072327A2 and WO2005089476A2. All of them stress the fact that the watermark must be imperceptible or not discernible. Even US20150242983A1, which discusses the compromise to be achieved between the imperceptibility of the watermark and its robustness, considers that invasive techniques, such as additive techniques, which provide greater robustness, must be applied by dividing the value to be added among a group of pixels in order to improve the imperceptibility.

Such imperceptibility of the watermarks included in the video signal frames causes that, when the communication path through which the video signal is transmitted degrades the quality thereof, it is sometimes impossible to recover the information encoded in the watermark (even by means of the "informed" or "non-blind" methods described in US20150242983A1) or to reconstruct the video signal if it is very degraded when it reaches its destination.

On the other hand, when a very precise, frame-by-frame synchronisation is required, the synchronisation proposed by said methods may not be sufficient for such a purpose.

Moreover, the aforementioned methods do not guarantee with absolute certainty that the data determined to be associated with the frames in the video signal or the video signal itself have not suffered any type of manipulation prior to reaching the receiver, i.e. that they are both correct and associated with one another.

Therefore, it is necessary to offer an alternative to the prior art which overcomes the deficiencies found therein, by providing a method and a system that make it possible to achieve the aforementioned precise synchronisation between video and data, as well as the aforementioned guarantee that there has been no manipulation or alteration of the data and/or the video signal.

DESCRIPTION OF THE INVENTION

To this end, a first aspect of the present invention relates to a method for synchronising video and data, which comprises:

i) providing at least one marked video signal that includes one video signal which comprises at least one marked frame that includes one watermark on one region of at least one original frame, wherein said watermark includes encoded synchronisation information about said at least one frame with data associated thereto;

ii) sending the aforementioned marked video signal to a receiver with access to a data signal that contains said associated data; and iii) performing a synchronisation step which comprises said receiver extracting the synchronisation information included in the watermark of said marked frame of the marked video signal, decoding it and using it to synchronise said frame with said data associated thereto.

Unlike the already known methods, in the method proposed by the first aspect of the present invention, in a characteristic manner:

the aforementioned step i) comprises:

ia) generating the aforementioned marked video signal by extracting an image fragment from a region of the aforementioned original frame, and arranging the watermark on said region of said original frame, replacing the image fragment extracted therefrom, to obtain the aforementioned marked frame; and ib) generating the aforementioned data signal, including therein the extracted image fragment and/or reconstruction information which allows for the reconstruction thereof;

the aforementioned step iii) comprises:

iiia) performing the aforementioned synchronisation step; and iiib) the receiver performing an additional synchronisation step which comprises:

iiib1) obtaining, from the data signal, the image fragment and/or the reconstruction information included therein, iiib2) obtaining, from the marked video signal received, an incomplete frame that includes the original frame without the watermark and without the extracted image fragment, and iiib3) attempting to reconstruct the original frame from the information obtained in iiib1) and iiib2), and, if the reconstruction is successful, determining that the frame of the video signal and the associated data of the data signal are duly synchronised.

According to an embodiment, sub-step ib) comprises including, in the data signal, synchronisation information about the data associated with the frame, and sub-step iia) comprises performing the synchronisation step by means of the receiver also extracting the synchronisation information included in the data signal and also using it to synchronise the frame with the data associated thereto.

Advantageously, according to the method proposed by the first aspect of the invention, step ii) comprises sending both the marked video signal and the data signal to the receiver, through communication paths that are independent from one another.

In general, the synchronisation information of the video signal, or the synchronisation information of both the video signal and the data signal, comprises at least one timecode associated with the original frame.

According to a preferred embodiment of the method proposed by the first aspect of the invention, the aforementioned frame is a first frame, and the method comprises synchronising a plurality of frames of the video signal with a corresponding plurality of associated data contained in the data signal, frame by frame, in the same manner as with the first frame, i.e. as described in the preceding paragraphs.

The method of the first aspect of the present invention comprises sending the video signal from an emitter to the aforementioned receiver, which is a remote receiver, through any type of communication path, even when the latter may cause signal losses or degradation (as may occur in the case of satellite communications), since, on the one hand, the watermark is arranged on or over the frame(s) in a manner as invasive and non-reversible as necessary, so it is very unlikely that it cannot be decoded at its destination, and, on the other hand, even if the frame(s) is/are very deteriorated when they reach the receiver, it/they may be reconstructed thanks to the reconstruction information contained in the data signal.

According to an embodiment, the method of the first aspect of the present invention comprises, if the reconstruction of step iiib3) is successful, displaying, on at least one screen, the video signal that includes the reconstructed frame or frames, and using the data associated with each reconstructed frame to take an action associated thereto, determined by the associated data, at the same time in which the frame is displayed.

According to some embodiments, the aforementioned action is at least one of the following: displaying, on at least the aforementioned screen, graphic and/or textual information (graphics, subtitles, legends, etc.) included in the associated data or accessible through them, reproducing audio from an audio signal included in the associated data or accessible through them, and controlling a device connected to the receiver using control commands included in the associated data or accessible through them.

Advantageously, the method of the present invention is applied to the television broadcast of the video signal to a plurality of televisions, or similar, from the receiver, either jointly with the associated data, duly synchronised frame by frame, if these have such a purpose, or controlled on the basis thereof, if the latter are data that includes control commands.

A second aspect of the present invention relates to a system for synchronising video and data, which comprises:
  a first computational entity, which is adapted to perform steps i) and ii) of the method of the first aspect; and
  a receiver that includes a second computational entity and which is adapted to perform step iii) of the method of the first aspect.

According to an embodiment, the aforementioned first computational entity and the aforementioned receiver have the capacity to communicate with one another through at least two independent communication paths, in order to implement the method of the first aspect.

In the present invention, the meaning given to the term "watermark" is very broad: it is understood to mean any type of graphic mark to be embedded in/inset with/attached to one or several frames of the video signal in the spatial or frequency domains, or a combination thereof, regardless of the data or the "metadata" encoded therein (i.e. the restrictive definition that is sometimes given to the term "watermark", to mean that mark which includes identifying information about the author of the content to which it is associated, is not accepted).

BRIEF DESCRIPTION OF THE DRAWINGS

The above and other advantages and characteristics will be more fully understood thanks to the following detailed description of some embodiments that refer to the attached drawings, which must be considered to be illustrative and non-limiting, wherein.

DETAILED DESCRIPTION OF SOME EMBODIMENTS

The method proposed by the first aspect of the invention comprises steps ia), ib), ii), iiia) and iiib) (iiib1, iiib2 and iiib3), which have already been described in a previous section.

Figure 1:
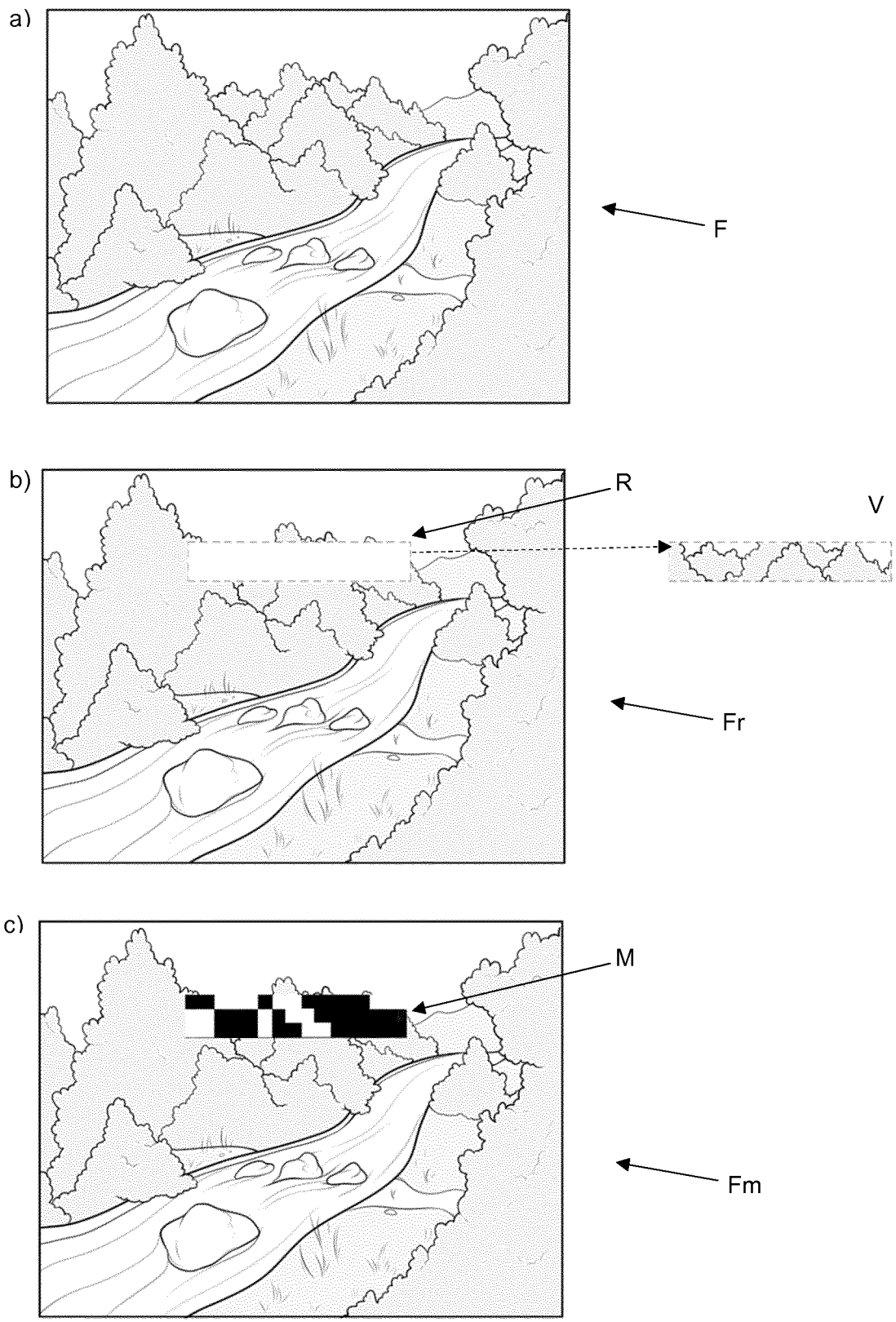
FIG. 1 graphically shows how an original frame is manipulated to include a watermark according to the method proposed by an embodiment of the first aspect of the invention.

In regards to step ia), i.e. the step for generating the marked video signal, FIG. 1 graphically illustrates how an original frame F (view a)) is manipulated to be converted into a marked frame Fm to be included in the aforementioned marked video signal, in particular, as may be observed in view b), by extracting an image fragment V from a region R of said original frame F, the latter becoming an incomplete frame Fr, and arranging the watermark M on the region R of the frame F, replacing the extracted image fragment V, to obtain the marked frame Fm (view c)).

Figure 2:
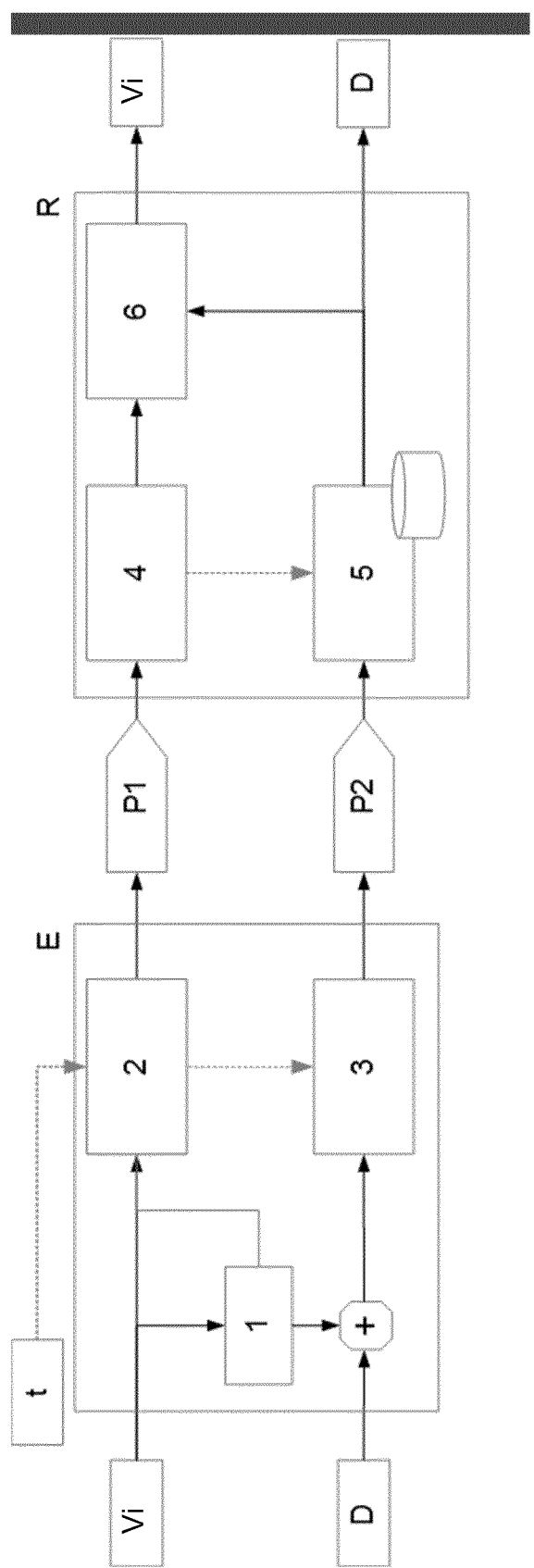
FIG. 2 schematically illustrates, by means of a block diagram, the system proposed by the second aspect of the invention when implementing the method of the first aspect.

In step ib), the extracted image fragment V and/or reconstruction information is/are included in the data signal sent to the receiver R (see FIG. 2).

In regards to the additional synchronisation step iiib), as described in a previous section, it includes the following sub-steps:
  iiib1) obtaining, from the data signal, the image fragment V and/or the reconstruction information included therein,
  iiib2) obtaining, from the marked video signal received, an incomplete frame Fr that includes the original frame F without the watermark M and without the extracted image fragment V, and
  iiib3) attempting to reconstruct the original frame F from the information obtained in iiib1) and iiib2), and, if the reconstruction is successful, determining that the frame of the video signal and the associated data of the data signal are duly synchronised.

FIG. 2 illustrates one possible implementation of the system proposed by the second aspect of the present invention for the transmission and synchronisation of video and data according to the method of the first aspect.

The system is formed by a video analyser 1, which extracts the necessary video information for the final reconstruction, i.e. the portion V or portions of the image (one or more per frame) and/or reconstruction information, a video encoder 2, which creates a video signal that combines the original video signal Vi (manipulated, i.e. with the frame or frames without the portion or portions V of the image) with a timecode t in the form of the watermark M (one or more per frame), according to step ia) of the method, the combined video signal being sent to the receiver R through a communication path P1.

The system also includes a data packer 3, which combines the timecode of the current frame with the information that is to be transmitted, i.e. with the data D, and the necessary information for the subsequent reconstruction, i.e. with the image portion V and/or the reconstruction information, according to step ib) of the method, the combined data signal being sent to the receiver R through another communication path P2.

At destination, the system comprises a receiver R, which is equipped with a video decoder 4, which is capable of interpreting the timecode contained in the watermark M, a synchroniser 5, which accumulates the combined data signal and synchronises it with the timecode picked up by the video decoder 4, and a reconstructor 6, which is capable of reconstructing the original video from the video with the watermark M and the synchronised data originating from the same frame, i.e. from Fm, Fr and V, such that the original video Vi synchronised with the original data D is obtained at the system outlet.

In general, a large part or each of the frames in the video signal are univocally synchronised with data associated thereto, frame by frame, according to the method of the first aspect of the invention.

Advantages Over the Already Known Proposals:

Reversible watermark encoding techniques use the video signal itself to send "concealed" data, such that they are imperceptible or that the original image may be reconstructed only by means of the information contained in the frame itself. The present invention offers the following advantages over the systems/methods that implement such techniques:

Greater security against signal degradation.

The usable bandwidth for each frame is not limited by the need not to "dirty" the image.

As the data follow a different pathway from that of the video signal, a greater security level is provided than in the already known proposals (both signals are necessary to reconstruct the original video and to access the data).

Examples of Usage:

The present invention may be used, amongst others, in the following scenarios:

To synchronise clocks between the point of emission and the receiver (for example, to paint a clock in a football broadcast from the destination, synchronise audio and video, etc.).

To send graphics controlled from the origin (sending the end-of-match computer graphics at the end of the broadcast).

To control equipment at destination from the origin (for example, a change in cameras at the origin launches a video at destination).

To send metadata associated with an image (for example, if the image of a character is shown, sending the name of said character).

A person skilled in the art may introduce changes and modifications to the embodiments described above without going beyond the scope of the invention as defined in the attached claims.

The invention claimed is:

1. A method for synchronising video and data, the method comprising:
   (i) providing at least one marked video signal that includes one video signal which comprises at least one marked frame that includes one watermark on one region of at least one original frame, wherein said watermark includes encoded synchronisation information for synchronizing said at least one original frame with data associated thereto;
   (ii) sending said marked video signal from an emitter to a receiver with access to a data signal that contains said associated data; and
   (iii) performing a synchronisation step which comprises said receiver extracting the synchronisation information included in the watermark of said marked frame of the marked video signal, decoding it and using it to synchronise said original frame with said data associated thereto;
   wherein:
      said step (i) comprises:
         (ia) generating said marked video signal by extracting an image fragment from a region of said original frame, and arranging said watermark on said region of said frame, replacing said extracted image fragment, to obtain said marked frame; and
         (ib) generating said data signal, including therein said extracted image fragment;
      said step (ii) comprises sending both said marked video signal and said data signal to said receiver through communication paths which are independent from one another; and
      said step (iii) comprises:
         (iiia) performing said synchronisation step; and
         (iiib) said receiver performing an additional synchronisation step which comprises:
            (iiib1) obtaining, from the data signal, the image fragment included therein;
            (iiib2) obtaining, from the marked video signal received, an incomplete frame that includes said original frame without the watermark and without the extracted image fragment; and
            (iiib3) attempting to reconstruct the original frame from the information obtained in (iiib1) and (iiib2), and, if the reconstruction is successful, determining that the frame of the video signal and the associated data of the data signal are duly synchronized, and further that a security level has been reached that guarantees that the correct signals necessary for the reconstruction of the original frame have arrived at the receiver via the respective independent communication paths.

2. The method of claim 1, wherein sub-step (ib) comprises including synchronisation information about said data associated with said original frame in the data signal, and sub-step (iia) comprises performing said synchronisation step via the receiver also extracting the synchronisation information included in the data signal and also using it to synchronise said original frame with the data associated thereto.

3. The method of claim 1, wherein the synchronisation information of the video signal, or the synchronisation information of both the video signal and the data signal, comprises a timecode associated with said original frame.

4. The method of claim 1, wherein said original frame is a first frame, and the method comprises synchronising a plurality of frames in the video signal with a corresponding plurality of associated data contained in the data signal, frame by frame, in the same manner as with said first frame.

5. The method of claim 1, comprising, if the reconstruction of step (iiib3) is successful, displaying, on at least one screen, the video signal that includes the reconstructed frame or frames, and using the data associated with each reconstructed frame to perform an action associated thereto, determined by the associated data, at the same time at which the frame is displayed.

6. The method of claim 5, wherein said action is at least one of the following actions: displaying, on at least said screen, graphic and/or textual information included in the associated data or accessible through them, reproducing audio from an audio signal included in the associated data or accessible through them, and controlling a device connected to the receiver using control commands included in the associated data or accessible through them.

7. A system for synchronising video and data, the system comprising:
- a first computational entity that is adapted to perform steps (i) and (ii) and corresponding sub-steps of a method for synchronising video and data; and
- a receiver that includes a second computational entity that is adapted to perform step (iii) and corresponding sub-steps of the method for synchronising video and data, wherein the method for synchronising video and data comprises:
(i) providing at least one marked video signal that includes one video signal which comprises at least one marked frame that includes one watermark on one region of at least one original frame, wherein said watermark includes encoded synchronisation information for synchronizing said at least one original frame with data associated thereto;
(ii) sending said marked video signal from an emitter to the receiver, wherein the receiver has access to a data signal that contains said associated data; and
(iii) performing a synchronisation step which comprises said receiver extracting the synchronisation information included in the watermark of said marked frame of the marked video signal, decoding it and using it to synchronise said original frame with said data associated thereto;

and further wherein:
said step (i) of said method comprises:
(ia) generating said marked video signal by extracting an image fragment from a region of said original frame, and arranging said watermark on said region of said frame, replacing said extracted image fragment, to obtain said marked frame; and
(ib) generating said data signal, including therein said extracted image fragment;

said step (ii) of said method comprises sending both said marked video signal and said data signal to said receiver, through communication paths which are independent from one another; and said step (iii) of said method comprises:
(iiia) performing said synchronisation step; and
(iiib) said receiver performing an additional synchronisation step which comprises:
(iiib1) obtaining, from the data signal, the image fragment included therein,
(iiib2) obtaining, from the marked video signal received, an incomplete frame that includes said original frame without the watermark and without the extracted image fragment, and
(iiib3) attempting to reconstruct the original frame from the information obtained in (iiib1) and (iiib2), and, if the reconstruction is successful, determining that the frame of the video signal and the associated data of the data signal are duly synchronized and further that a security level has been reached that guarantees that the correct signals, necessary for the reconstruction of the original frame, have arrived at the receiver via the respective independent communication paths.

8. The system of claim 7, wherein said first computational entity and said receiver have the capacity to communicate with one another through at least two independent communication paths in order to implement the method.

* * * * *